United States Patent
Cave et al.

(10) Patent No.: US 7,443,821 B2
(45) Date of Patent: Oct. 28, 2008

(54) METHOD FOR CLEAR CHANNEL ASSESSMENT OPTIMIZATION IN A WIRELESS LOCAL AREA NETWORK

(75) Inventors: Christopher Cave, Candiac (CA); Vincent Roy, Montreal (CA); Paul Marinier, Brossard (CA); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 546 days.

(21) Appl. No.: 10/937,123

(22) Filed: Sep. 9, 2004

(65) Prior Publication Data

US 2005/0152313 A1    Jul. 14, 2005

Related U.S. Application Data

(60) Provisional application No. 60/535,021, filed on Jan. 8, 2004.

(51) Int. Cl.
  *H04Q 7/00* (2006.01)
  *H04Q 7/24* (2006.01)
  *H04L 1/00* (2006.01)

(52) U.S. Cl. .................. 370/333; 370/252; 370/338

(58) Field of Classification Search .......... 370/241, 370/252, 338, 465, 333
See application file for complete search history.

(56) References Cited

U.S. PATENT DOCUMENTS

| | | | | |
|---|---|---|---|---|
| 6,381,570 B2* | 4/2002 | Li et al. | | 704/233 |
| 7,206,840 B2* | 4/2007 | Choi et al. | | 709/225 |
| 2003/0007473 A1* | 1/2003 | Strong et al. | | 370/338 |
| 2003/0016647 A1 | 1/2003 | Margon | | |
| 2004/0120424 A1* | 6/2004 | Roberts | | 375/327 |
| 2005/0266803 A1 | 12/2005 | Dinur et al. | | |

FOREIGN PATENT DOCUMENTS

| | | |
|---|---|---|
| CA | 2564178 | 9/2002 |
| EP | 0903891 | 3/1999 |
| KR | 100174779 | 4/1999 |
| KR | 20030045859 | 6/2003 |
| KR | 20030080021 | 10/2003 |
| TW | 341739 | 10/1998 |
| WO | 95/08224 | 3/1995 |
| WO | 00/44185 | 7/2000 |
| WO | 01/22663 | 3/2001 |
| WO | 02/43275 | 5/2002 |
| WO | 02/071627 | 9/2002 |
| WO | 02/093839 | 11/2002 |

OTHER PUBLICATIONS

Durand et al. "Dynamic Multilevel Power Control," IEEE 802.11-05/1068r0 (Nov. 2005).

* cited by examiner

*Primary Examiner*—Vincent P. Harper
*Assistant Examiner*—Marivelisse Santiago
(74) *Attorney, Agent, or Firm*—Volpe and Koenig, P.C.

(57) ABSTRACT

A method for optimizing clear channel assessment (CCA) parameters in a wireless local area network having an access point (AP) and at least one station begins by receiving a trigger condition. An upper bound and a lower bound for an energy detect threshold (EDT) parameter are determined. A value of the EDT parameter is calculated and is bound by the upper bound and the lower bound. Lastly, the EDT parameter is updated. The method can be performed at each station or at the AP, with the updated CCA parameters being signaled to each station associated with the AP.

21 Claims, 2 Drawing Sheets

METHOD FOR CLEAR CHANNEL ASSESSMENT OPTIMIZATION IN A WIRELESS LOCAL AREA NETWORK

CROSS REFERENCE TO RELATED APPLICATION(S)

This application claims the benefit of U.S. Provisional Application No. 60/535,021, filed Jan. 8, 2004, which is incorporated by reference as if fully set forth herein.

FIELD OF THE INVENTION

The present invention relates generally to wireless local area networks (WLANs), and more particularly, to a method for optimizing clear channel assessment parameters in a WLAN.

BACKGROUND

In WLAN systems, the Distributed Coordination Function (DCF) is the fundamental access method for asynchronous data transfer on a best effort basis. The WLAN DCF mode is used to support contention services promoting fair access to the channel for all stations. The multiple access scheme used to achieve this is Carrier Sense Multiple Access with Carrier Avoidance (CSMA/CA). One way by which stations detect if the channel is busy is by analyzing all detected packets that are sent from other WLAN users and by detecting activity in the channel via relative signal strength from other sources. The physical carrier sensing that is performed prior to data transmission is referred to as Clear Channel Assessment (CCA).

CCA is used for transmission and reception of packets in 802.11 devices. Prior to data transmission, the device must ensure that the wireless medium is free, by using CCA. For data reception, the device only senses packets that meet the CCA criterion for a busy channel.

The 802.11 standards define different CCA modes. A commonly used CCA mode requires carrier sense and energy above the Energy Detect Threshold (EDT) before reporting that the medium is busy. More specifically, CCA reports a busy medium upon detection of a WLAN type of signal with energy above the EDT. Other CCA modes require carrier sense only, or energy above the EDT only.

A single EDT parameter is typically used to tune CCA for both transmission and reception of packets. CCA is well-tuned for transmission when:

1) The access point (AP) always senses the channel as busy when a station (STA) from its basic service set (BSS) is transmitting a packet.

2) The AP always senses the channel as busy when the STA to which it has a packet to send also senses the channel as busy due to a packet transmission from a device in a neighboring BSS. By satisfying this condition, the AP defers to external packets that would cause transmission errors.

3) The AP always senses the channel as free when the STA to which it has a packet to send senses the channel as free, even if a device from a neighboring BSS is using the channel. By satisfying this condition, unnecessary deferrals are avoided.

On the other hand, CCA is well-tuned for reception when:

1) The AP is capable of receiving packets from all STAs within the coverage area of its BSS. If the EDT parameter is set too high, the AP might not receive packets that are transmitted by a STA located at the cell edge.

2) The AP does not sense packets from devices in neighboring BSSs. If the EDT parameter is set too low, the AP might "carrier lock" onto packets that are transmitted by STAs that are located outside of its BSS or transmitted by other APs. By "locking" on external transmissions, the AP will miss any transmission from a STA in its own BSS. Such a scenario would result in a packet error, as the packet from the STA in its own BSS would collide with the external packet that the AP is receiving.

Determining the ideal EDT setting involves a trade-off between optimizing for packet transmission and optimizing for packet reception. Moreover, a dynamic method for adjusting the EDT parameter is required in order to adapt to varying network conditions (e.g., a change in the BSS size).

SUMMARY

Three methods for optimizing CCA parameters in a WLAN having an access point (AP) and at least one non-AP station (STA) are described. The term "CCA parameters" is used herein to designate collectively the CCA mode and the value of the EDT parameter.

The first method does not require any specific signaling between STAs, or between a STA and an AP. In this method, each STA or AP attempts to independently find the optimal setting for its own CCA parameters based on certain statistics. There is no sharing of information between the STAs and AP regarding the setting of the CCA parameters. This method begins by receiving a trigger condition. An upper bound and a lower bound for the EDT parameter are determined. A value of the EDT parameter is calculated and is bound by the upper bound and the lower bound. Lastly, the EDT parameter is updated. The method can be performed at any one STA, all STAs, or at the AP.

The second method requires signaling between STAs or between a STA and an AP, to communicate the values of CCA parameters used by the STAs or the AP. In this method, each node (STA or AP) has the possibility of learning about the values of the CCA parameters used by other STAs or the AP, but a node can only modify its own CCA parameters. This second method begins with a STA or the AP requesting from other STAs and/or the AP to report the values of the CCA parameters currently used. The requested STAs and/or the AP report these values to the requesting STA or AP. The requesting STA or AP then computes the optimal values to use for its own CCA parameters. Following this computation, the requesting STA or AP may change the values of its own CCA parameters and, optionally, signal the new values to the other STAs or the AP.

The third method requires signaling between STAs or between a STA and an AP, that enables one STA or the AP to modify the values of the CCA parameters used by other STAs or the AP. In this third method, a node may determine the optimum settings of the CCA parameters for itself as well as for other nodes in the system, and may request that the other nodes use their respective optimum CCA parameters as determined by the requesting node. In an infrastructure BSS comprising one AP and one or several STAs, the requesting node should preferably be the AP. This method begins with the AP calculating the optimal CCA parameters for one or multiple STAs associated to the AP. This calculation may (or may not) be the same as the calculation used in the first method. Following the determination of the optimal CCA parameters for each STA, the AP signals the respective values of the optimal CCA parameters to each STA. The STAs determine if the requested change of parameters is possible and indicates the success or failure of the change in a response message to the AP.

An access point for optimizing CCA parameters in a wireless local area network having at least one station comprises a receiver, an energy detector, a channel availability determination device, and a CCA calculation device which receives input parameters from the access point and calculates the CCA parameters.

A station for optimizing CCA parameters in a wireless local area network having an access point comprises a receiver, an energy detector, a channel availability determination device, and a CCA calculation device which receives input parameters from the station and calculates the CCA parameters.

An integrated circuit for optimizing CCA parameters in a wireless local area network comprises a receiver, an energy detector, a channel availability determination device, and a CCA calculation device which receives input parameters and calculates the CCA parameters.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

The present invention describes methods to dynamically optimize the EDT parameter that is used for CCA in WLAN systems.

TABLE 1

Parameter Definitions

| Symbol/Name | Description |
| --- | --- |
| $T_{Periodic}$ | The basic triggering time period |
| $P_{AP}$ | AP transmission power |
| $P_{STA}$ | Station transmission power |
| $RS_{AP}$ | AP receiver sensitivity |
| $RNG_{base}$ | Baseline Range of the AP. The baseline range specifies the coverage area that is serviced by the AP. The baseline range can either be manually configured or dynamically determined by the AP during system operation. |
| $N_{Tx}$ | Number of packets over which the transmitted packet error rate is calculated. |
| $N_{Rx}$ | Number of packets over which the received packet error rate is calculated. |
| $PER_{Tx}^{MAX}$ | The target maximum transmitted packet error rate. |
| $PER_{Rx}^{MAX}$ | The target maximum received packet error rate. |
| $DR^{MAX}$ | The target maximum deferral rate |

TABLE 1-continued

Parameter Definitions

| Symbol/Name | Description |
| --- | --- |
| α | Weighting factor for received packet error rate. |
| β | Weighting factor for transmitted packet error rate. |
| γ | Weighting factor for deferral rate. |
| Δ | EDT basic step size. |

TABLE 2

Measurement Definitions

| Symbol/Name | Description |
| --- | --- |
| $PER_{Tx}$ | The transmitted packet error rate. This measurement is calculated using a sliding window of $N_{Tx}$ last transmitted packets. |
| $PER_{Rx}$ | The received packet error rate. This measurement is calculated using a sliding window of $N_{Rx}$ last received packets. |
| DR | Deferral rate. This is a measurement that represents the percentage of time that the AP is carrier locked by an out-of-BSS packet and has at least one packet to transmit. |

Figure 1:
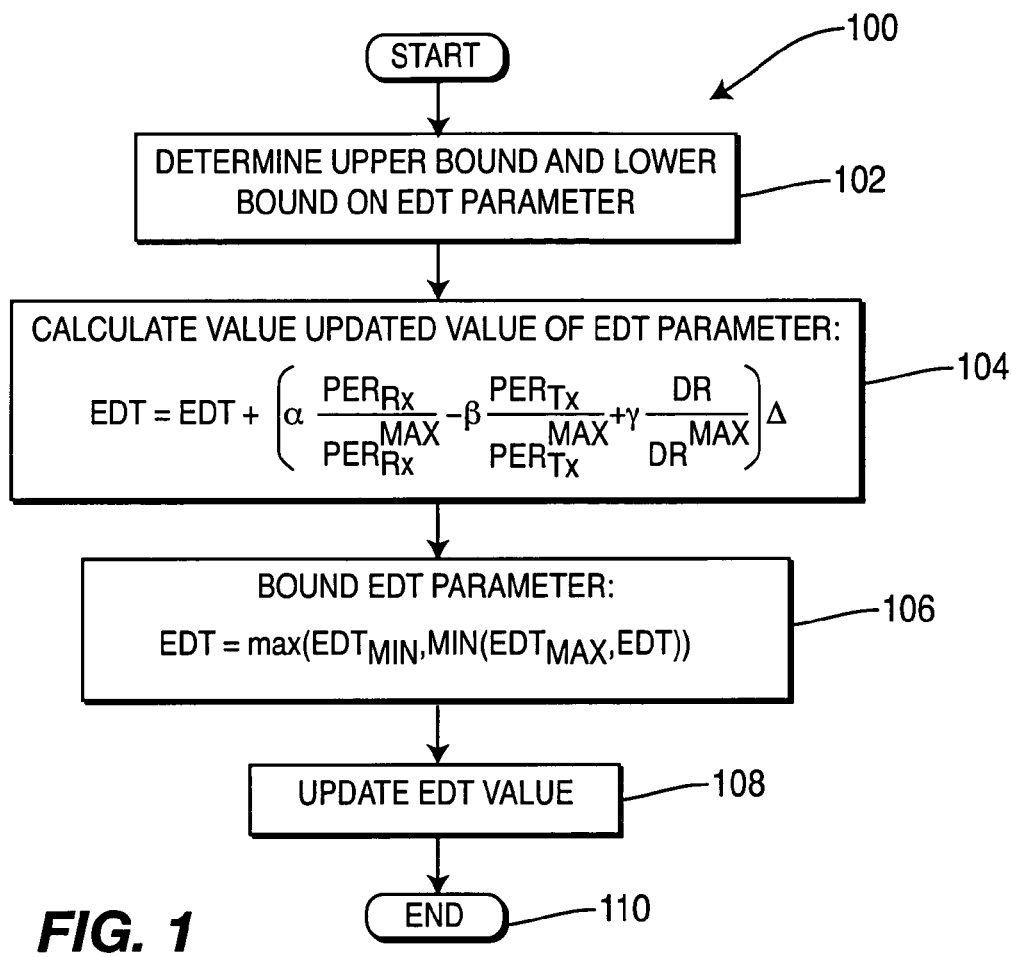
FIG. 1 is a flowchart of an energy detection threshold optimization process in accordance with a first method of the present invention.

A flowchart of a CCA optimization process 100 using a first method in accordance with the present invention is shown in FIG. 1. The process 100 can be applied both at the AP and at individual STAs. This CCA optimization process addresses the determination of the proper level of the EDT. The CCA mode is preferably set so that it indicates busy if the received signal is above EDT and a WLAN signal is sensed. Alternatively, the CCA mode may be set so that it indicates busy if the received signal is above EDT only.

Triggering

The EDT optimization process 100 is triggered on any of the following conditions:

1. $PER_{Tx} > PER_{Tx}^{MAX}$ and at least $N_{Tx}$ packets have been transmitted since the last EDT update.

2. $PER_{Rx} > PER_{Rx}^{MAX}$ and at least $N_{Rx}$ packets have been received since the last EDT update.

3. Expiration of a periodic triggering timer, i.e., $T_{Elapsed} > T_{Periodic}$, and at least $N_{Tx}$ packets have been transmitted and at least $N_{Rx}$ packets have been received since the last EDT update. $T_{Elapsed}$ is the elapsed time since the last EDT update.

When triggered according to condition 1, the optimization process 100 attempts to solve the insufficient deferral problem. One cause for excessive packet errors in the downlink (DL) is an overly high EDT setting; the AP does not sense the channel as busy while STAs are carrier-locked on neighboring BSS transmissions. A minimum number of transmitted packets are imposed to ensure that a problem really exists.

When triggered according to condition 2, the optimization process 100 attempts to solve the exceedingly sensitive AP problem. One cause for excessive packet errors in the uplink (UL) is an overly low EDT setting; the AP locks onto neighboring BSS packets, causing it to miss packets from its own STAs. An UL packet error generally occurs when a STA transmits a packet while the AP is already carrier-locked on a neighboring BSS transmission. A minimum number of received packets are imposed to ensure that a problem really exists.

Condition 3 is for general optimization purposes. The optimization process 100 is triggered periodically, once enough packets have been transmitted and received to have collected significant statistics.

The triggering parameters should be selected so that the optimization process 100 reacts quickly to an excessive packet error situation. For example, the optimization process 100 could trigger periodically once per second, once sufficient statistics have been collected. If a minimum of 100 packets is required for triggering, a 10% error rate results in 10 errors.

Determining EDT Bounds

The optimization process 100 begins by determining upper and lower bounds for the EDT parameter (step 102). An upper bound on the EDT parameter, $EDT_{MAX}$, is determined as follows:

$$EDT_{MAX} = P_{STA} - (RNG_{base} + RNG_{adj}) \quad \text{Equation (1)}$$

where $RNG_{adj}$ is a range adjustment value determined by the Power Control algorithm. The EDT parameter should be set so that the AP can at least sense all packets originating from its own BSS. $EDT_{MAX}$ corresponds to the signal level at which a transmission from a STA located at the cell edge is received.

The calculated value of $EDT_{MAX}$ is compared to the maximum value allowed by the 802.11 standards, and the lower of the two values is taken. The maximum EDT value allowed by the standard is based on the AP's transmission power, $P_{AP}$. $EDT_{MAX}$ is dynamically calculated as $RNG_{base}$, $RNG_{adj}$, and $P_{STA}$ can be modified by the Power Control algorithm at any time, and is updated whenever there is a change to $RNG_{base}$, $RNG_{adj}$, or $P_{STA}$.

The lower bound on the EDT parameter, $EDT_{MIN}$, is set to the AP receiver sensitivity level, $RS_{AP}$.

EDT Update

Next, the EDT parameter is calculated based on its current value, the received and transmitted packet error rates, and the deferral rate (step 104):

$$EDT = EDT + \left( \alpha \frac{PER_{Rx}}{PER_{Rx}^{MAX}} - \beta \frac{PER_{Tx}}{PER_{Tx}^{MAX}} + \gamma \frac{DR}{DR^{MAX}} \right) \Delta \quad \text{Equation (2)}$$

The default values for the weighting factors is 1, and can be optimized based on the deployment of the system (i.e., the layout of the APs and the STAs).

The EDT parameter is adjusted between the lower and upper bounds (step 106):

$$EDT = \max(EDT_{MIN}, \min(EDT_{MAX}, EDT)) \quad \text{Equation (3)}$$

The EDT value is updated (step 108) and the process terminates (step 110). It is noted that if a channel change occurred since the last invocation of the EDT optimization process 100, the EDT parameter is automatically set to $EDT_{MIN}$.

Alternatively, it is possible use different EDT parameter settings for transmission and reception. $EDT_{Tx}$ is optimized for packet transmission, whereas $EDT_{Rx}$ is optimized for packet reception. Immediately before sending a packet, the AP sets the CCA EDT parameter to $EDT_{Tx}$, and sets it back to $EDT_{Rx}$ once the data transmission is complete.

$EDT_{Tx}$ is determined using a procedure similar to that shown in FIG. 1, except using the following equation:

$$EDT_{Tx} = EDT_{Tx} + \left( \gamma \frac{DR}{DR^{MAX}} - \beta \frac{PER_{Tx}}{PER_{Tx}^{MAX}} \right) \Delta \quad \text{Equation (4)}$$

$EDT_{Tx}$ is then adjusted between the upper and lower bounds, as shown in Equation (3).

In one embodiment, $EDT_{Rx} = RNG_{base}$. In another embodiment, $EDT_{Rx}$ is set according to the following equation:

$$EDT_{Rx} = EDT_{MAX} - \alpha \frac{PER_{Rx}}{PER_{Rx}^{MAX}} \quad \text{Equation (5)}$$

Figure 2:
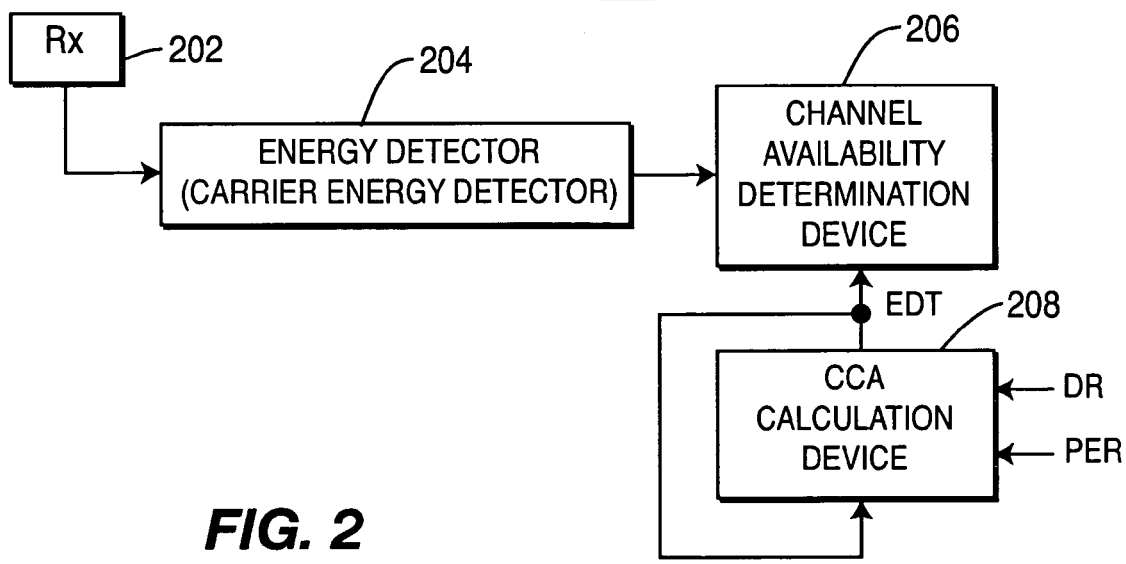
FIG. 2 is a block diagram of an apparatus embodying the process shown in FIG. 1.

FIG. 2 shows an AP or a STA 200 constructed in accordance with the present invention. The AP or STA 200 includes a receiver 202 connected to an energy detector 204. A channel availability determination device 206 is connected to the energy detector 204 and a CCA calculation device 208 is connected to the channel availability determination device 206. The CCA calculation device 208 accepts parameters, such as DR and PER, as inputs and outputs an EDT value to the channel availability determination device 206 which uses the EDT value to determine if the channel is busy. The EDT value is also cycled back into the CCA calculation device 208, and is used as shown in Equations 2 and 3.

Figure 3:
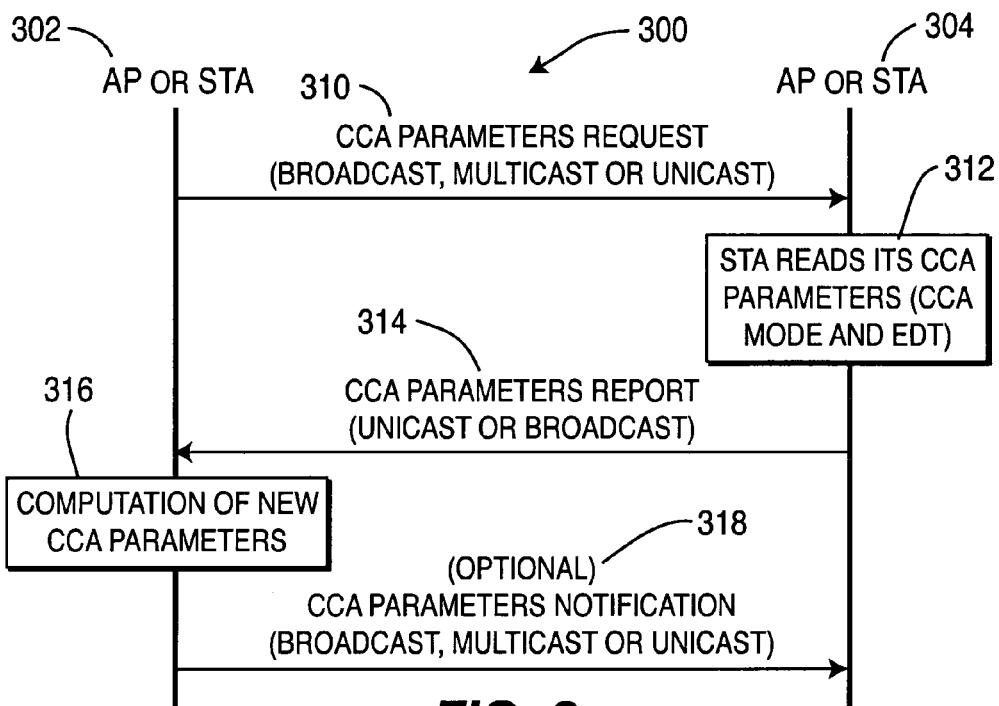
FIG. 3 is a diagram showing the signaling between an AP or STA and another AP or STA to implement a second method in accordance with the present invention.

A diagram of a CCA optimization process 300 using the second method is shown in FIG. 3. This method can be used by any STA or AP. The STA or AP using the method is referred to as the "optimizing" station 302. The optimizing station 302 requests information about the setting of the CCA parameters in other STAs or AP 304 (step 310). There are several possibilities for implementing this signaling.

The first possibility is for the optimizing station 302 to send separate requests (unicast) to each surrounding STA or AP 304 ("requested stations") whose addresses are known by the optimizing station 302. The optimizing station 302 may know these addresses by different means. For example, if the optimizing station 302 is an AP, it necessarily knows the addresses of all STAs associated to it. If the optimizing station 302 is a STA, it can learn about the addresses of other STAs in the same basic service set (BSS) by looking at the MAC addresses of received packets. However, the WLAN protocol may not allow direct communication between STAs in an infrastructure BSS. In that case, this method would be usable by the AP only.

The request must contain the addresses of the optimizing station 302 and the requested station 304. In an 802.11 WLAN, this information would already be in the MAC header. Optionally, the request may contain a time limit for the requested station 304 to respond. The requested station 304 sends back an acknowledgment just after correct reception of the packet containing the request (just as any other packet directed to a specific station). In this way, the optimizing station 302 knows that the requested station 304 has properly received the request, and can retransmit the packet containing the request if it did not receive an acknowledgment within a certain time.

A second possibility is for the optimizing station 302 to send one general request directed to all surrounding stations 304. This can be done by transmitting a broadcast message specifying only the basic service set (BSS) identity, in which case only the STAs belonging to the specified BSS would respond. This can also be done by transmitting a multicast message specifying the addresses of all STAs from which it is desired to have the CCA parameters reported.

In a third possibility, a STA (non-AP) may request the AP to which it is associated for the CCA parameters of one or more STA(s) associated to this AP, instead of directly requesting the parameters from the STA. This request would contain the address of the STA(s) from which it is desired to have the CCA parameters reported, or a special flag indicating that the CCA parameters from all STAs in the BSS are requested. Following this request, the AP may respond with the CCA parameters of the requested stations 304. The AP may already have this information, or it may need to request the information (using one of the mechanisms described above) from the STAs prior to responding to the optimizing station 302.

For any STA that successfully receives a CCA parameters request according to one of the mechanisms described above, that STA reads the values of the CCA parameters it is currently using (step 312). These values (CCA mode and EDT) can be normally found in the management information base (MIB) of the requested station 304. After having read the CCA parameters, the requested station 304 (after gaining access to the medium according to the usual 802.11 protocol) transmits a CCA parameters report (step 314). This report may be a broadcast to all STAs in the BSS (in which case no acknowledgment is expected) or, preferably, may be a unicast directed at the optimizing station 302. In the latter case, an acknowledgment is expected from the optimizing station 302 and the requested station 304 can re-transmit in case of failure. The report contains the values of the CCA parameters.

Once the optimizing station 302 has received CCA parameters reports from all requested stations 304 (or after a certain period of time has elapsed since the transmission of the requests, at the discretion of the optimizing station 302), the optimizing station 302 calculates the new CCA parameters it will use for itself (step 316).

A simple method for determining CCA parameters is to use those of the most sensitive STA from which CCA parameters were received (i.e., the STA with the lowest setting of the EDT parameter). If path loss information is available, the EDT parameter can be calculated to be as sensitive as the most sensitive reporting STA. For example, an AP could set its EDT parameter such that it is as sensitive to external transmissions as its most sensitive STA is. The AP could achieve this by setting its EDT parameter lower than the sensitive STA's EDT parameter by an amount equal to the difference in path losses to the most dominant external interferers.

After the optimizing station 302 has calculated the new CCA parameters it should use, it can immediately apply the new setting. Optionally, it may send a CCA parameters notification to other requested stations 304 to inform them of the new setting now used by the optimizing station 302 (step 318). This message may be directed to specific STAs (unicast) or multiple STAs (multicast or broadcast).

Figure 4:
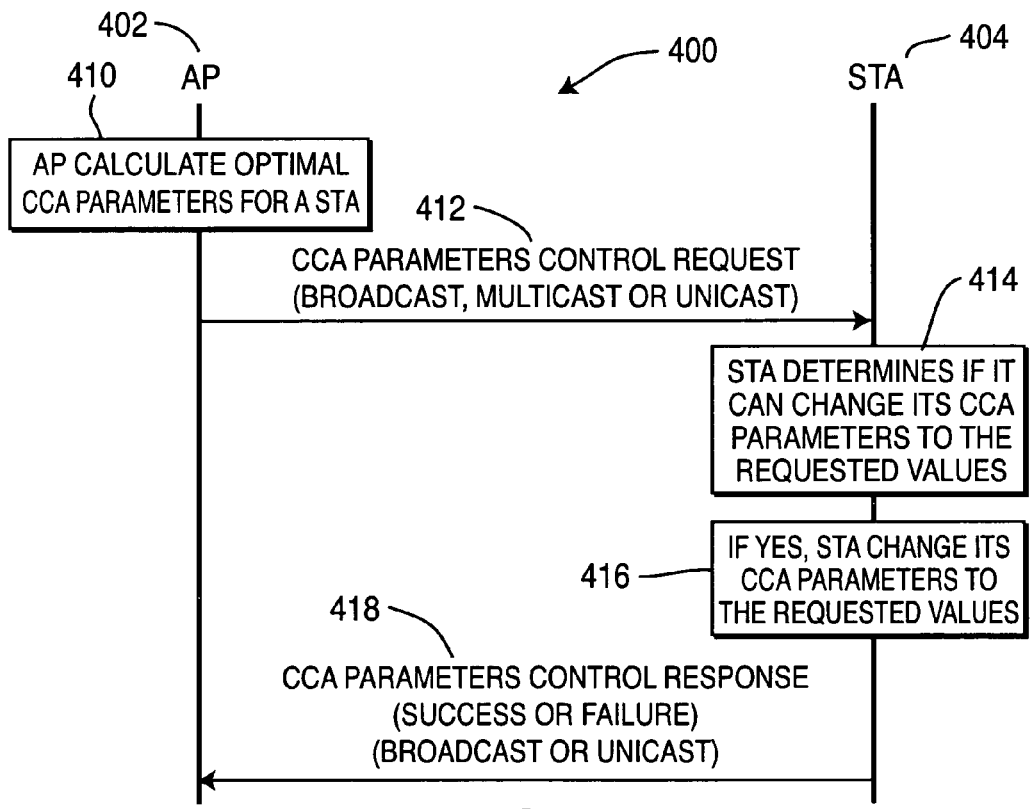
FIG. 4 is a diagram showing the signaling between an AP and a STA to implement a third method in accordance with the present invention.

A diagram of a CCA optimization process 400 using the third method is shown in FIG. 4. This method is preferably used by the AP in an infrastructure BSS, although use by a non-AP station is not precluded (e.g., in an independent BSS). The AP using the method is referred to as "controlling" station 402. The controlling station 402 computes or estimates the optimal CCA parameters for itself and other STAs in the same BSS ("controlled" stations 404; step 410). This determination may or may not be performed using the method 100 disclosed above.

After having determined the optimal CCA parameters for every STA (these may or may not be different from one controlled station 404 to another depending on the algorithm), the controlling station 402 requests the controlled stations 404 to modify their CCA parameters ("CCA parameters control request"; step 412). If the CCA parameters are the same for all controlled stations 404, the controlling station 402 may transmit a broadcast message containing the BSS identity along with the values of the CCA parameters, and optionally a time limit for responding. It may also transmit a multicast message containing the addresses of all controlled stations 404 along with the values for the CCA parameters. Preferably, the controlling station 402 transmits a unicast message (with acknowledgment) separately to each controlled station 404 with its new CCA parameters. When the new CCA parameters are different from one controlled station 404 to another, multicast or unicast messages are mandatory.

Following successful reception of the CCA parameters control request message, a controlled station 404 determines whether it is possible to apply the new CCA parameters requested by the controlling station 402 (step 414). Applying the new parameters may not be possible, depending on the capabilities of the controlled station 404 (e.g., radio sensitivity or the availability of the requested CCA mode). If the modification is possible, the controlled station 404 immediately modifies its CCA parameters (step 416) and transmits a response ("CCA parameters control response") as a unicast message to the controlling station 402 (preferred) or as a broadcast message to all STAs in the BSS (step 418). This message contains a flag indicating the success or failure of the CCA parameters modification. In case of failure, the message may optionally contain a "cause" field that specifies the reason for the failure (such as unavailable CCA mode or requested EDT value too low or too high). It may also contain the values of the CCA parameters currently in use by the controlled station 404.

After receiving the responses from all controlled stations 404 (or after a certain period of time has elapsed since the transmission of the requests, at the discretion of the controlling station 402), the controlling station 402 may decide to do nothing until the next scheduled activation of the optimization algorithm, in a manner similar to that described in the method 100. The controlling station 402 may also decide to repeat the transmission of requests to the controlling stations 404 in case some of them did not transmit back a response.

While the present invention is described herein in connection with a WLAN, the principles of the present invention can be applied to other types of wireless communication systems. In such circumstances, the STA could include, but is not limited to, devices such as a wireless transmit/receive unit (WTRU), a user equipment, a fixed or mobile subscriber unit, a pager, or any other type of device capable of operating in a wireless environment. Similarly, the AP could include, but is not limited to, devices such as a base station, a Node B, a site controller, or any other type of interfacing device in a wireless environment.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for optimizing clear channel assessment parameters comprising:
   receiving a trigger condition;
   determining an upper bound and a lower bound for an energy detection threshold (EDT) parameter in response to the trigger condition;
   calculating a value of the EDT parameter by adding a current value of the EDT parameter and a product of a step size value multiplied by a weighted sum of:
      a received packet error rate divided by a target maximum received packet error rate,
      a transmitted packet error rate divided by a target maximum transmitted packet error rate, and
      a deferral rate divided by a target maximum deferral rate;
   bounding the EDT parameter by the upper bound and the lower bound; and
   updating the EDT parameter.

2. The method according to claim 1, wherein the trigger condition exists when a transmitted packet error rate exceeds a target maximum transmitted packet error rate and a minimum number of packets have been transmitted.

3. The method according to claim 1, wherein the trigger condition exists when a received packet error rate exceeds a target maximum received packet error rate and a minimum number of packets have been received.

4. The method according to claim 1, wherein the trigger condition exists when a minimum time period has passed, a minimum number of packets have been transmitted, and a minimum number of packets have been received.

5. The method according to claim 1, wherein the upper bound is determined by subtracting a sum of a baseline range of an access point and a range adjustment value from a transmission power of a station.

6. The method according to claim 1, wherein the lower bound is equal to an access point receiver sensitivity level.

7. The method according to claim 1, wherein the method is performed at an access point and the updated EDT parameter is signaled to each station associated to the AP.

8. The method according to claim 7, wherein the updated EDT parameter is signaled individually to each station associated to the AP.

9. The method according to claim 7, wherein the updated EDT parameter is broadcast simultaneously to all stations associated to the AP.

10. The method according to claim 1, wherein the current value of the EDT parameter, the step size value, the received packet error rate, the target maximum received packet error rate, the transmitted packet error rate, the target maximum transmitted packet error rate, the deferral rate, and the target maximum deferral rate are retrieved from memory.

11. The method according to claim 1, wherein the current value of the EDT parameter, the step size value, the received packet error rate, the target maximum received packet error rate, the transmitted packet error rate, the target maximum transmitted packet error rate, the deferral rate, and the target maximum deferral rate are received from a remote entity.

12. A method for optimizing clear channel assessment parameters comprising:
   receiving a trigger condition;
   determining an upper bound and a lower bound for an energy detection threshold (EDT) parameter in response to the trigger condition;
   calculating a value of the EDT parameter, including calculating an EDT transmission value and an EDT reception value, wherein the EDT transmission value is calculated by adding a current value of the EDT transmission value and a product of a step size value multiplied by a weighted sum of:
      a deferral rate divided by a target maximum deferral rate, and
      a transmitted packet error rate divided by a target maximum transmitted packet error rate;
   bounding the EDT parameter by the upper bound and the lower bound; and
   updating the EDT parameter.

13. The method according to claim 12, wherein the EDT reception value is equal to a baseline range of an access point.

14. The method according to claim 12, wherein the EDT reception value is calculated by subtracting a weighting factor multiplied by a received packet error rate divided by a target maximum received packet error rate from a maximum EDT value.

15. The method according to claim 14, wherein the weighting factor, the received packet error rate, the target maximum received packet error rate, and the maximum EDT value are retrieved from memory.

16. The method according to claim 14, wherein the weighting factor, the received packet error rate, the target maximum received packet error rate, and the maximum EDT value are received from a remote entity.

17. The method of according to claim 12, wherein the method is performed at an access point (AP) and the updated EDT parameter is signaled to each station associated to the AP.

18. The method of according to claim 17, wherein the updated EDT parameter is signaled individually to each station associated to the AP.

19. The method of according to claim 17, wherein the updated EDT parameter is broadcast simultaneously to all stations associated to the AP.

20. The method according to claim 12, wherein the current value of the EDT transmission value, the step size value, the deferral rate, the target maximum deferral rate, the transmitted packet error rate, and the target maximum transmitted packet error rate are retrieved from memory.

21. The method according to claim 12, wherein the current value of the EDT transmission value, the step size value, the deferral rate, the target maximum deferral rate, the transmitted packet error rate, and the target maximum transmitted packet error rate are received from a remote entity.

* * * * *